US012562313B2

(12) United States Patent
Ryoo et al.

(10) Patent No.: US 12,562,313 B2
(45) Date of Patent: Feb. 24, 2026

(54) MULTILAYER ELECTRONIC COMPONENT

(71) Applicant: SAMSUNG ELECTRO-MECHANICS CO., LTD., Suwon-si (KR)

(72) Inventors: Hye Won Ryoo, Suwon-si (KR); Kyung Sik Kim, Suwon-si (KR); Seung In Baik, Suwon-si (KR); Min Young Choi, Suwon-si (KR); Jong Hwan Lee, Suwon-si (KR); Hyung Soon Kwon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 119 days.

(21) Appl. No.: 18/414,789

(22) Filed: Jan. 17, 2024

(65) Prior Publication Data

US 2024/0282525 A1 Aug. 22, 2024

(30) Foreign Application Priority Data

Feb. 21, 2023 (KR) ........................ 10-2023-0022760

(51) Int. Cl.
    *H01G 4/12* (2006.01)
    *H01G 4/30* (2006.01)
    (Continued)

(52) U.S. Cl.
    CPC ............. *H01G 4/1227* (2013.01); *H01G 4/30* (2013.01); *H01G 4/0085* (2013.01); *H01G 4/012* (2013.01); *H01G 4/2325* (2013.01)

(58) Field of Classification Search
    CPC ...... H01G 4/1227; H01G 4/30; H01G 4/0085; H01G 4/012; H01G 4/2325; H01G 4/12; H01G 4/232; H01G 4/1209; H01G 4/1245
    See application file for complete search history.

(56) References Cited

U.S. PATENT DOCUMENTS 6,043,174 A * 3/2000 Maher .................. H01G 4/1227
                                                      501/137
8,592,335 B2 * 11/2013 Okamoto ................. H01G 4/30
                                                      501/138
(Continued)

FOREIGN PATENT DOCUMENTS

JP      2022-057629 A    4/2022
KR   10-2015-0036335 A  4/2015
            (Continued)

OTHER PUBLICATIONS

Chemical Diffusivity of BaTiO3: IV, Acceptor-Doped Case (2000).
            (Continued)

*Primary Examiner* — Dion R. Ferguson
(74) *Attorney, Agent, or Firm* — Morgan, Lewis & Bockius LLP

(57) ABSTRACT

A multilayer electronic component includes a body including dielectric layers and internal electrodes; and an external electrode disposed on the body. The body includes a capacitance forming portion including the dielectric layers and the internal electrodes in a first direction, and a cover portion disposed on both end-surfaces of the capacitance forming portion in the first direction. One of the dielectric layers includes a first acceptor element containing Al, a second acceptor element containing at least one of Mg, Mn, or V, and Ti. The one of the dielectric layers and the cover portion include a plurality of dielectric grains, and a ratio (G1/G2) of an average size (G1) of the plurality of dielectric grains included in the one of the dielectric layers relative to an average size (G2) of the plurality of dielectric grains included in the cover portion satisfies $1.00 \leq G1/G2 < 1.50$.

14 Claims, 6 Drawing Sheets

(51) Int. Cl.

| | | |
|---|---|---|
| *H01G 4/008* | (2006.01) | |
| *H01G 4/012* | (2006.01) | |
| *H01G 4/232* | (2006.01) | |

(56) References Cited

U.S. PATENT DOCUMENTS

| | | | | |
|---|---|---|---|---|
| 9,390,856 | B2 * | 7/2016 | Yoon | H01G 4/1227 |
| 11,127,532 | B2 * | 9/2021 | Choi | C04B 35/4682 |
| 11,222,749 | B2 * | 1/2022 | Kim | H01G 4/248 |
| 11,527,363 | B2 * | 12/2022 | Han | H01G 4/012 |
| 11,636,979 | B2 * | 4/2023 | Chun | H01G 4/012 |
| | | | | 361/321.2 |
| 11,984,264 | B2 * | 5/2024 | Shin | H01G 4/30 |
| 12,125,641 | B2 * | 10/2024 | Park | H01G 4/30 |
| 12,230,445 | B2 * | 2/2025 | Koo | H01G 4/30 |
| 2006/0034033 | A1 * | 2/2006 | Philofsky | H10D 1/682 |
| | | | | 257/E27.048 |
| 2006/0284233 | A1 * | 12/2006 | Suh | H01G 4/1227 |
| | | | | 257/E51.027 |
| 2010/0008019 | A1 * | 1/2010 | Burn | C04B 35/465 |
| | | | | 501/136 |
| 2011/0157769 | A1 * | 6/2011 | Kang | H01G 4/30 |
| | | | | 501/137 |
| 2012/0147524 | A1 | 6/2012 | Okamoto et al. | |
| 2015/0155099 | A1 | 6/2015 | Nishimura et al. | |
| 2019/0304686 | A1 | 10/2019 | Kang et al. | |
| 2020/0243262 | A1 * | 7/2020 | Kwak | H01G 4/228 |
| 2020/0395172 | A1 * | 12/2020 | Choi | C04B 35/468 |
| 2020/0395175 | A1 * | 12/2020 | Kim | C04B 35/4682 |
| 2022/0028620 | A1 | 1/2022 | Tsuru et al. | |
| 2022/0102076 | A1 | 3/2022 | Isota et al. | |
| 2022/0139624 | A1 * | 5/2022 | Sim | H01G 4/30 |
| | | | | 361/301.4 |
| 2022/0157530 | A1 | 5/2022 | Kim et al. | |
| 2022/0181080 | A1 * | 6/2022 | Chun | H01G 4/1227 |
| 2022/0208452 | A1 * | 6/2022 | Shin | H01G 4/30 |
| 2022/0208453 | A1 * | 6/2022 | Kang | H01G 4/30 |
| 2022/0216008 | A1 * | 7/2022 | Kim | H01G 4/30 |
| 2022/0375688 | A1 * | 11/2022 | Yoon | H01G 4/12 |
| 2023/0119343 | A1 * | 4/2023 | Park | H01G 4/1227 |
| | | | | 361/301.4 |
| 2024/0212937 | A1 * | 6/2024 | Kim | H01G 4/1245 |
| 2024/0242884 | A1 * | 7/2024 | Kwon | C04B 35/4682 |
| 2024/0242888 | A1 * | 7/2024 | Yun | H01G 4/1227 |
| 2024/0282525 | A1 * | 8/2024 | Ryoo | H01G 4/1227 |

FOREIGN PATENT DOCUMENTS

| | | |
|---|---|---|
| KR | 10-2021-0028624 A | 3/2021 |
| KR | 10-2022-0067994 A | 5/2022 |
| KR | 10-2022-0128973 A | 9/2022 |
| WO | 2011/027625 A1 | 3/2011 |

OTHER PUBLICATIONS

Effect of Al2O3 dopant on abnormal grain growth in BaTiO3 (2005).

Extended European Search Report dated Nov. 29, 2024 issued in the corresponding European Patent Application No. 24153927.9.

* cited by examiner

FIRST
DIRECTION

SECOND
DIRECTION

I–I'

FIRST
DIRECTION

THIRD
DIRECTION          II–II'

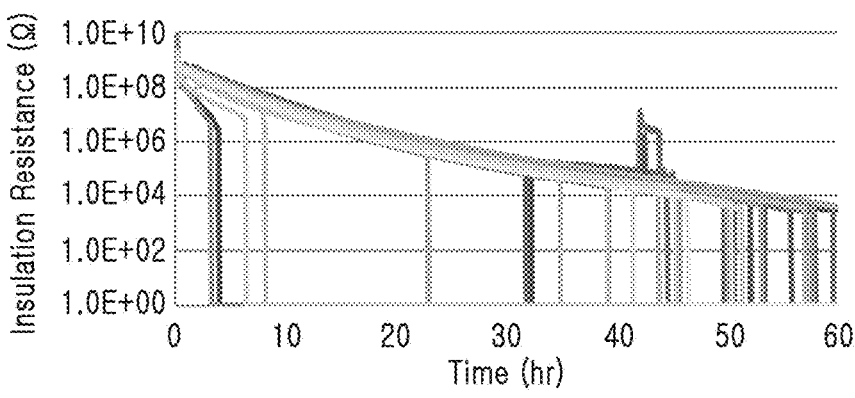
FIG. 7A
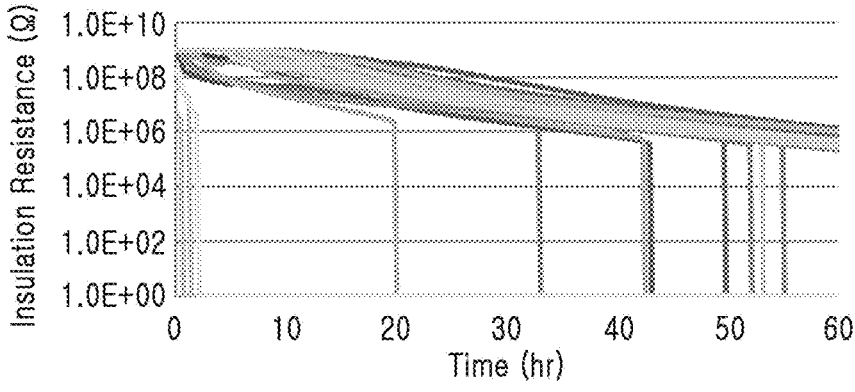
FIG. 7B
FIG. 7C

MULTILAYER ELECTRONIC COMPONENT

CROSS-REFERENCE TO RELATED APPLICATION(S)

This application claims benefit of priority to Korean Patent Application No. 10-2023-0022760 filed on Feb. 21, 2023 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip condenser mounted on the printed circuit boards of various types of electronic products such as image display devices including a liquid display (LCD), a plasma display panel (PDP), or the like, a computer, a smartphone, a mobile phone, or the like, serving to charge or discharge electricity therein or therefrom.

Such a multilayer ceramic capacitor may be used as a component of various electronic devices, as the multilayer ceramic capacitor has a small size with high capacitance and is easily mounted. As various electronic devices such as computers, mobile devices, or the like have been miniaturized and implemented with high-output, demand for miniaturization and the implementation of high capacitance in multilayer ceramic capacitors has increased.

Meanwhile, as the marketplace for IT MLCCs as well as automotive electronics MLCCs expands, demand for products having high rated voltage and excellent reliability in the same capacitance range is increasing. Among additive elements in an MLCC dielectric composition, impact of a fixed valence acceptor, a transition metal element, a variable valence acceptor, and a rare earth element on reliability is already widely known, and is generally known. Therefore, conditions having good reliability are selected by optimizing a composition ratio of additive elements in the MLCC dielectric composition including the above-mentioned additive elements. While a base metal electrode (BME) MLCC has been industrialized, an operation for composition optimization has been continuously conducted to improve reliability. However, even with the same dielectric composition, since there may be significant differences in reliability depending on a microstructure, degrees of distribution and solid solution of additive elements, and process conditions, an optimal composition design is needed.

In a conventional MLCC composition system, reliability deterioration has frequently occurred under harsh temperature conditions during driving of the product due to a high concentration of oxygen vacancy defects. Recently, research into suppressing reliability deterioration has been performed by a composition design for minimizing the concentration of oxygen vacancies, which affects a high-temperature reliability lifespan. This may be a principle that an electron is generated as an oxygen vacancy is filled by adding an element acting as a donor dopant in $BaTiO_3$, and may be known as a change to an n-type composition by suppressing reliability deterioration due to suppression of an n-p junction. However, due to the nature of the MLCC product, which may include a composite material of a metal and an oxide, the addition of a dopant element acting as an acceptor may be essential. In addition, since specific elements classified as acceptor dopants may be closely related to uniform grain growth and densification of a dielectric layer, there may be a need to configure a dielectric composition by adjusting the specific elements in an appropriate ratio.

SUMMARY

An aspect of the present disclosure is to improve reliability of a multilayer electronic component through an optimal composition design.

An aspect of the present disclosure is to provide a multilayer electronic component having excellent reliability while realizing densification of a dielectric layer.

Various problems to be solved by the present disclosure may not be limited to those described above, and may be more easily understood in the process of explaining specific embodiments of the present disclosure.

According to an aspect of the present disclosure, a multilayer electronic component includes a body including a plurality of dielectric layers and a plurality of internal electrodes; and an external electrode disposed on the body. The body includes a capacitance forming portion including the plurality of dielectric layers and the plurality of internal electrodes alternately disposed with the plurality of dielectric layers in a first direction, and a cover portion disposed on both end-surfaces of the capacitance forming portion in the first direction. One of the plurality of dielectric layers includes a first acceptor element containing Al, a second acceptor element containing at least one of Mg, Mn, or V, and Ti, and satisfies $0.4 \text{ mol} \leq A1 < 0.6 \text{ mol}$ and $0.44 \leq A1/(A1+T1) < 0.55$ (where, A1 is a mole number of the first acceptor element, relative to 100 moles of Ti contained in the one of the plurality of dielectric layers, and T1 is a mole number of the second acceptor element, relative to 100 moles of Ti contained in the one of the plurality of dielectric layers). The one of the plurality of dielectric layers and the cover portion include a plurality of dielectric grains, and a ratio (G1/G2) of an average size (G1) of the plurality of dielectric grains included in the one of the plurality of dielectric layers relative to an average size (G2) of the plurality of dielectric grains included in the cover portion satisfies $1.00 \leq G1/G2 < 1.50$.

BRIEF DESCRIPTION OF DRAWINGS

The above and other aspects, features, and advantages of the present disclosure will be more clearly understood from the following detailed description, taken in conjunction with the accompanying drawings.

FIGS. 7A to 7C are high-temperature reliability evaluation graphs of sample chips.

DETAILED DESCRIPTION

Figure 1:
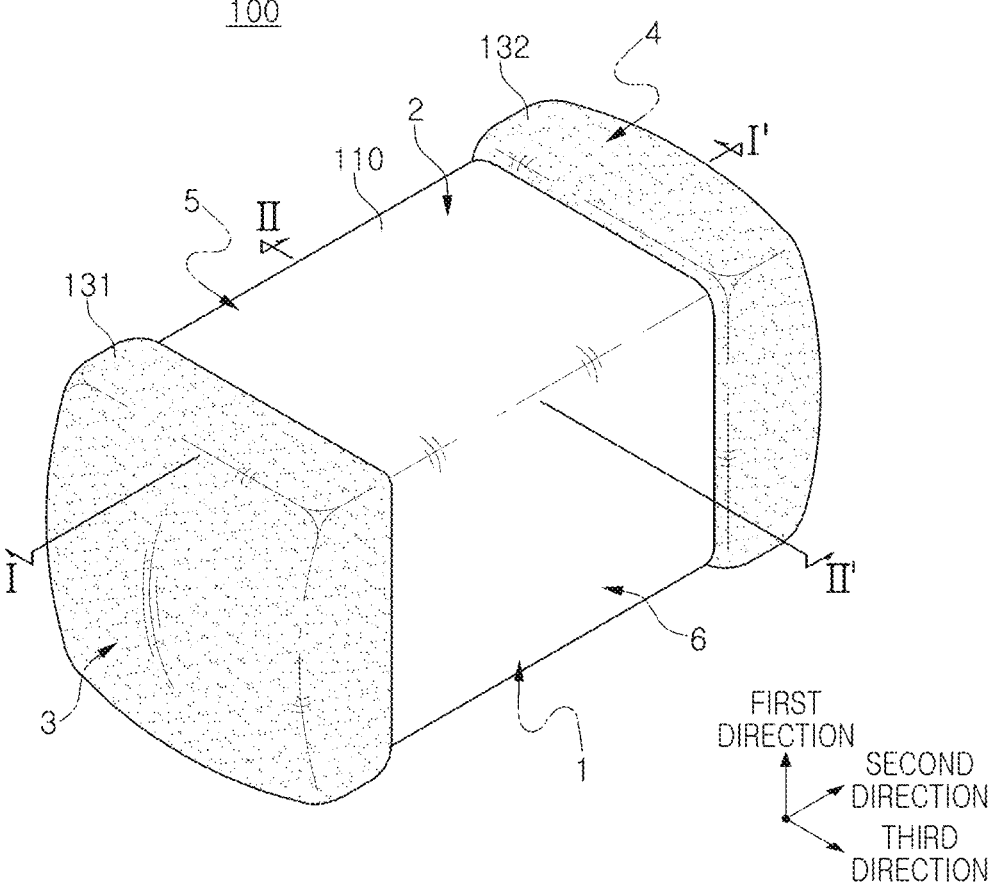
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes, sizes, and the like, of the elements in the drawings may be exaggerated for clarity of description, and the elements denoted by the same reference numerals in the drawings may be the same elements.

In order to clearly explain the present disclosure in the drawings, portions not related to the description will be omitted for clarification of the present disclosure, and a thickness may be enlarged to clearly illustrate layers and regions. The same reference numerals will be used to designate the same components in the same reference numerals. Further, throughout the specification, when an element is referred to as "comprising" or "including" an element, it means that the element may further include other elements as well, without departing from the other elements, unless specifically stated otherwise.

In the drawings, a first direction may be defined as a stack direction or a thickness T direction, a second direction may be defined as a length L direction, and a third direction may be defined as a width W direction.

Multilayer Electronic Component

FIG. 1 schematically illustrates a perspective view of a multilayer electronic component according to an embodiment of the present disclosure.

Figure 2:
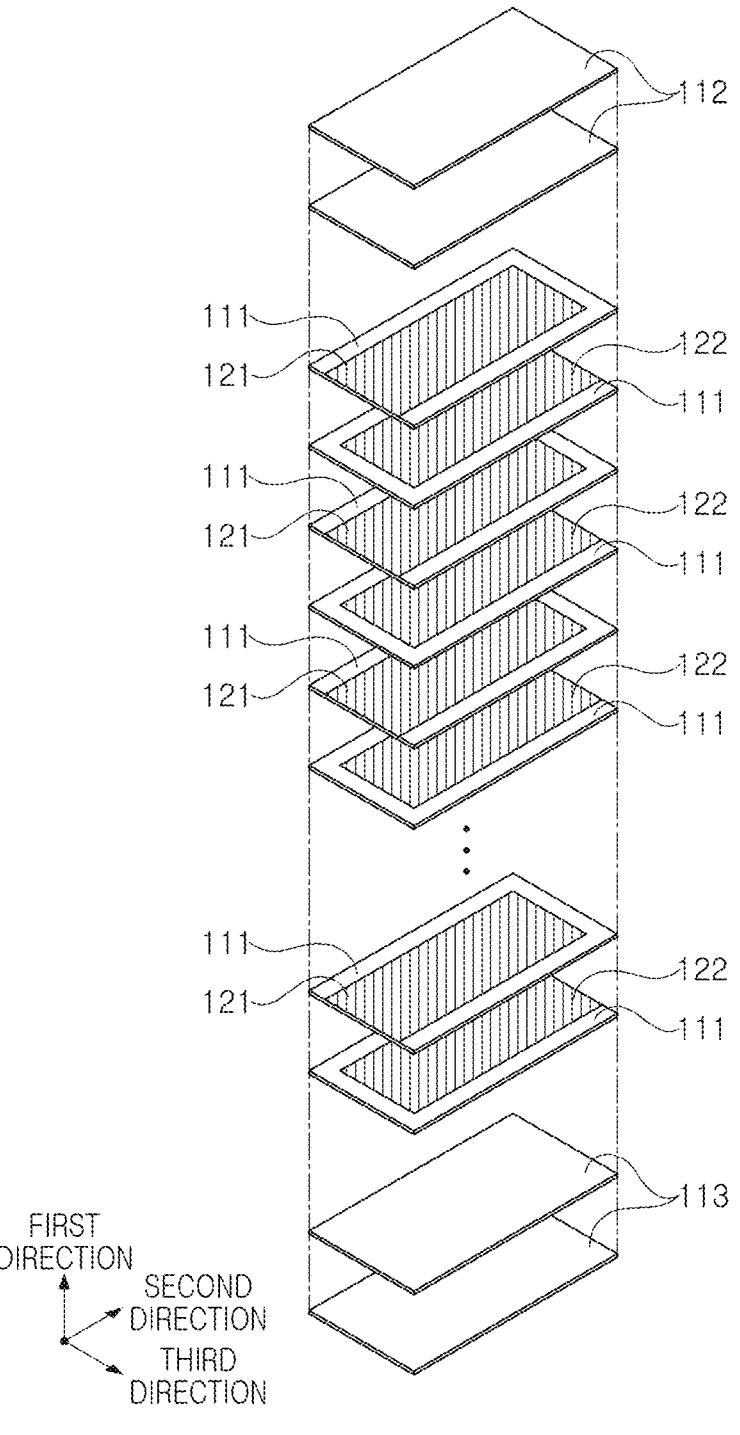
FIG. 2 schematically illustrates an exploded perspective view illustrating a stacked structure of internal electrodes.

FIG. 2 schematically illustrates an exploded perspective view illustrating a stacked structure of internal electrodes.

Figures 3, 4:
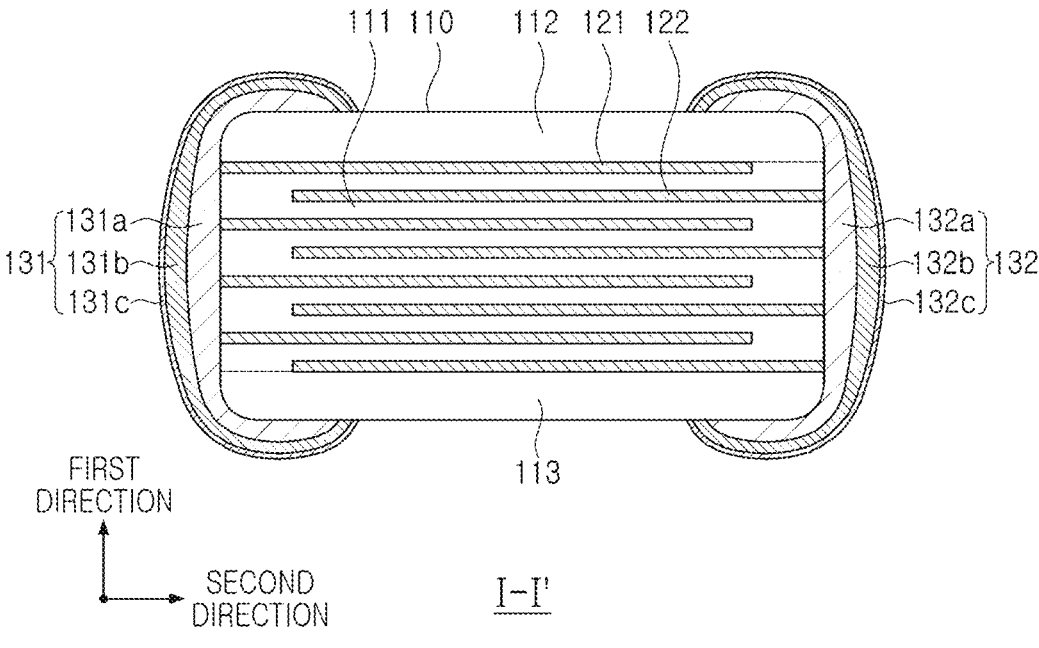
FIG. 3 schematically illustrates a cross-sectional view of FIG. 1, taken along line I-I'.
FIG. 4 schematically illustrates a cross-sectional view of FIG. 1, taken along line II-II'.
Figures 5A, 5B, 5C, 5D:
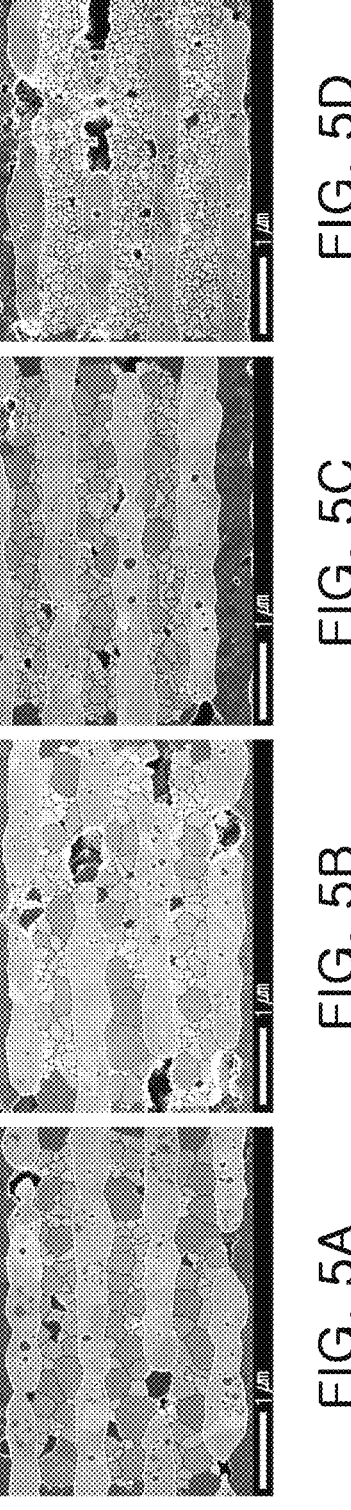
FIGS. 5A to 5D are images of capacitance forming portions of sample chips, captured using an SEM.
Figures 6A, 6B, 6C, 6D:
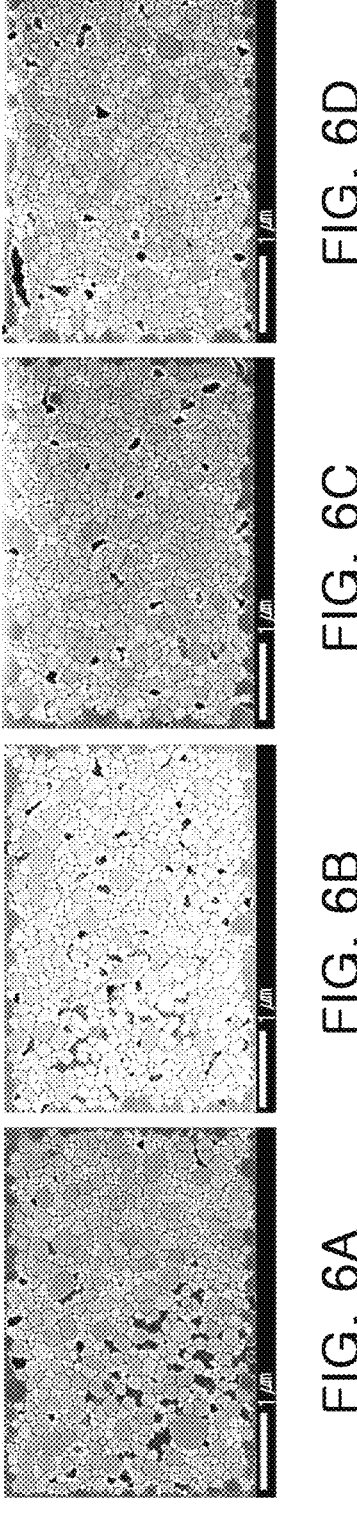
FIGS. 6A to 6D are images of cover portions of sample chips, captured using an SEM.

FIG. 3 schematically illustrates a cross-sectional view of FIG. 1, taken along line I-I'.

FIG. 4 schematically illustrates a cross-sectional view of FIG. 1, taken along line II-II'.

Hereinafter, with reference to FIGS. 1 to 4, a multilayer electronic component according to an embodiment of the present disclosure will be described in detail. A multilayer ceramic capacitor will be described as an example of a multilayer electronic component, but the example embodiment may also be applied to various electronic products using a dielectric composition, such as an inductor, a piezoelectric element, a varistor, a thermistor, or the like.

A multilayer electronic component 100 according to an embodiment of the present disclosure may include a body 110 including a plurality of dielectric layers 111 and a plurality of internal electrodes 121 and 122; and an external electrode 131 and 132 disposed on the body 110. The body 110 may include a capacitance forming portion Ac including the plurality of dielectric layers 111 and the plurality of internal electrodes 121 and 122 alternately disposed with the plurality of dielectric layers 111 in a first direction, and a cover portion 112 and 113 disposed on at least one of both end-surfaces of the capacitance forming portion Ac in the first direction. One or each of the plurality of dielectric layers 111 may include a first acceptor element containing Al, a second acceptor element containing at least one of Mg, Mn, or V, and Ti, and satisfy 0.4 mol≤A1<0.6 mol and 0.44≤A1/(A1+T1)<0.55 (where, A1 is a mole number of the first acceptor element, relative to 100 moles of Ti contained in the one or each of the plurality of dielectric layers 111, and T1 is a mole number of the second acceptor element, relative to 100 moles of Ti contained in the one or each of the plurality of dielectric layers 111). The one or each of the plurality of dielectric layers 111 and the cover portion 112 and 113 may include a plurality of dielectric grains, and a ratio (G1/G2) of an average size (G1) of the plurality of dielectric grains included in the one or each of the plurality of dielectric layers relative to an average size (G2) of the plurality of dielectric grains included in the cover portion may satisfy 1.00≤G1/G2<1.50.

In the body 110, the dielectric layer 111 and the internal electrode 121 and 122 may be alternately stacked.

More specifically, the body 110 may be disposed in the body 110, and may include a first internal electrode 121 and a second internal electrode 122, alternately disposed to face each other, with the dielectric layer 111 interposed therebetween, to include the capacitance forming unit Ac that forms capacitance.

Although the specific shape of the body 110 is not particularly limited, the body 110 may have a hexahedral shape or the like, as illustrated. Due to shrinkage of ceramic powder particles included in the body 110 during a sintering process, the body 110 may not have a perfectly straight hexahedral shape, but may have a substantially hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in the third direction.

The plurality of dielectric layers 111 forming the body 110 may be in a sintered state, and a boundary between adjacent dielectric layers 111 may be integrated to such an extent that it may be difficult to identify the same without using a scanning electron microscope (SEM).

A raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x)TiO_3(0<x<1)$, $Ba(Ti_{1-y}Ca_y)O_3(0<y<1)$, $(Ba_{1-x}Ca_x)(Ti_{1-y}Zr_y)O_3(0<x<1, 0<y<1)$, $Ba(Ti_{1-y}Zr_y)O_3(0<y<1)$, or the like, in which calcium (Ca), zirconium (Zr), or the like is partially dissolved in $BaTiO_3$, or the like.

In addition, various ceramic additives, organic solvents, binders, dispersants, or the like may be added to a powder of barium titanate ($BaTiO_3$) or the like, as a raw material for forming the dielectric layer 111.

Among additive elements in an MLCC dielectric composition, impact of a fixed valence acceptor, a transition metal element, which is a variable valence acceptor, and a rare earth element on reliability is already widely known, and is generally known. Therefore, conditions having good reliability are selected by optimizing a composition ratio of additive elements in the MLCC dielectric composition including the above-mentioned additive elements. While a base metal electrode (BME) MLCC has been industrialized, an operation for composition optimization has been continuously conducted to improve reliability. Even with the same dielectric composition, there may be significant differences in reliability depending on a microstructure, degrees of distribution and solid solution of additive elements, and process conditions.

More specifically, a dielectric of a current high-capacity BME MLCC such as X5R, X7R, X8R, Y5V, or the like may be based on a material sintered by doping a fixed valence acceptor such as Mg, Al, or the like and a rare earth element acting as a donor such as Y, Dy, Ho, Er, or the like to a $BaTiO_3$ base material, or a base material such as (Ba,Ca)$(Ti,Ca)O_3$, $(Ba,Ca)(Ti,Zr)O_3$ and $Ba(Ti,Zr)O_3$ in which Ca, Zr, or the like is partially dissolved, and additionally adding a variable valence acceptor such as Mn, V, or Cr, an excess Ba, $SiO_2$ or an additive such as a sintering aid containing the same, or the like. To realize normal capacity and insulation characteristics of a high-capacity MLCC in sintering the same under a reducing atmosphere, grain growth suppression and reduction resistance should be implemented, and it is known that these two effects may be implemented by adding an appropriate amount of the fixed valence acceptor such as Mg. However, when only the fixed valence acceptor such as Mg is added, withstand voltage characteristics and reliability of the dielectric may be poor. A transition metal element, which is the variable valence acceptor, such as Mn or V, and a rare earth element may be added together to improve withstand voltage and reliability. As mentioned above, most of these elements may be co-doped, and may be dissolved in a shell region of a grain of the $BaTiO_3$ base material to form a core-shell structure, to realize stable capacity characteristics and reliability depending on a temperature of the MLCC. Therefore, it may be expected that reliability will be good only when the additive elements are not segregated in a secondary phase and are well dissolved in a $BaTiO_3$ lattice of the shell region.

In a conventional MLCC composition system, reliability deterioration has frequently occurred under harsh temperature conditions during driving of the product due to a high concentration of oxygen vacancy defects. Recently, researches for suppressing reliability deterioration have been performed by a composition design for minimizing the concentration of oxygen vacancies, which affects a high-temperature reliability lifespan. This may be a principle that an electron is generated as an oxygen vacancy is filled by adding an element acting as a donor dopant in $BaTiO_3$, and may be known as a change to an n-type composition by suppressing reliability deterioration due to suppression of n-p junction. However, due to the nature of the MLCC product, which may include a composite material of a metal and an oxide, the addition of a dopant element acting as an acceptor may be essential. In addition, since specific elements classified as acceptor dopants may be closely related to uniform grain growth and densification of a dielectric layer, there may be a need to configure a dielectric composition by adjusting the specific elements in an appropriate ratio.

In the present disclosure, the acceptor element may include Al, Mg, Mn, or V, and the acceptor element including Al may be defined as a first acceptor element, and the acceptor element including Mg, Mn, or V may be defined as a second acceptor element. The present disclosure is not limited thereto, and the first and second acceptor elements may further include other acceptor elements. The first acceptor element and the second acceptor element include different elements.

According to an embodiment of the present disclosure, the dielectric layer 111 included in the capacitance forming portion Ac may include the first acceptor element containing Al, the second acceptor element containing at least one of Mg, Mn, or V, and Ti, and, if a mole number of the first acceptor element is defined as A1 and a mole number of the second acceptor element is defined as T1, relative to 100 moles of Ti contained in the dielectric layer 111 of the capacitance forming portion Ac, may satisfy 0.4 mol≤A1<0.6 mol and 0.44≤A1/(A1+T1)<0.55.

A ratio of elements acting as acceptors in the dielectric composition may be adjusted to satisfy 0.4 mol≤A1<0.6 mol and 0.44≤A1/(A1+T1)<0.55, to design a donor-rich composition, thereby providing a multilayer electronic component having excellent high-temperature reliability while implementing densifying of the dielectric layer.

When a mole number of A1 contained in the dielectric layer 111 of the capacitance forming portion Ac is 0.6 mol or more or a ratio of A1/(A1+T1) is 0.55 or more, there may be a risk that high-temperature reliability is deteriorated due to an increase in oxygen vacancy concentration. When a mole number of A1 is may be less than 0.4 mole or a ratio of A1/(A1+T1) is less than 0.44, electrical conductivity may be improved by a change to an n-type composition, but grain growth of the dielectric composition may be suppressed and porosity may increase to deteriorate density and moisture resistance reliability, and a problem of deterioration in dielectric properties may occur.

In this case, the dielectric layer 111 and the cover portion 112 and 113, which will be described later, may include a plurality of dielectric grains, and a ratio (G1/G2) of an average size (G1) of the plurality of dielectric grains included in the dielectric layer 111 relative to an average size (G2) of the plurality of dielectric grains included in the cover portion 112 and 113 may satisfy 1.00≤G1/G2<1.50.

The ratio (G1/G2) of the average size (G1) of the plurality of dielectric grains included in the dielectric layer 111 relative to the average size (G2) of the plurality of dielectric grains included in the cover portion 112 and 113 may satisfy 1.00≤G1/G2<1.50 to have desired dielectric capacitance characteristics and good moisture resistance reliability.

The average size (G1) of the plurality of dielectric grains included in the dielectric layer 111 may be 100 nm or more and 400 nm or less, and preferably 150 nm or more and 300 nm or less.

A method of measuring sizes of the plurality of dielectric grains included in the dielectric layer 111 is not particularly limited.

For example, an image of 5 μm×3 μm (horizontal× vertical) may be obtained by an SEM such that a dielectric layer located in a central region may be observed based on cross-sections of the body in the first and second directions, and sizes of the dielectric grains present in the region may be measured.

A size of a dielectric grain may correspond to a size of the longest straight line from one grain boundary to another grain boundary, and the average size of the dielectric grain may mean an average value of sizes of each of the dielectric grains measured by the method described above.

A thickness td of the dielectric layer 111 is not particularly limited.

To achieve high capacitance of the multilayer electronic component, the thickness of the dielectric layer 111 may be 3.0 μm or less, and to more easily achieve miniaturization and high capacitance of the multilayer electronic component, the thickness of the dielectric layer 111 may be 1.0 μm or less, preferably 0.6 μm or less, more preferably 0.4 μm or less.

In this case, the thickness td of the dielectric layer 111 may mean a thickness td of a dielectric layer 111 disposed between the first and second internal electrodes 121 and 122.

The thickness td of the dielectric layer 111 may mean a size of the dielectric layer 111 in the first direction. Also, the thickness td of the dielectric layer 111 may mean an average thickness td of the dielectric layer 111, and may mean an average size of the dielectric layer 111 in the first direction.

The average size of the dielectric layer 111 in the first direction may be measured by scanning images of cross-sections of the body 110 in the first and second directions with a scanning electron microscope (SEM) at a magnification of 10,000. More specifically, the average size of one dielectric layer 111 in the first direction means an average value calculated by measuring a size of one dielectric layer 111 in the second direction at thirty (30) equally spaced points in the scanned image in the first direction. The thirty (30) equally spaced points may be designated in the capacitance forming unit Ac. In addition, when such an average value is determined by extensively using measurements of average values to ten (10) dielectric layers 111, the average size of the dielectric layers 111 in the first direction may be further generalized.

The internal electrode 121 and 122 may be alternately stacked with the dielectric layer 111.

The internal electrode 121 and 122 may include the first internal electrode 121 and the second internal electrode 122, and the first and second internal electrodes 121 and 122 may be alternately disposed to oppose each other with the dielectric layers 111, constituting the body 110, interposed therebetween, and may be exposed from the third and fourth surfaces 3 and 4 of the body 110, respectively.

More specifically, the first internal electrode 121 may be spaced apart from the fourth surface 4, and may be exposed from the third surface 3, and the second internal electrode 122 may be spaced apart from the third surface 3, and may be exposed from the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

For example, the first internal electrode 121 may not be connected to the second external electrode 132, but may be connected to the first external electrode 131, and the second internal electrode 122 may not be connected to the first external electrode 131, but may be connected to the second external electrode 132. In this case, the first and second internal electrodes 121 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed, and then sintering the stacked ceramic green sheets.

A material for forming the internal electrode 121 and 122 may not be particularly limited, and a material having excellent electrical conductivity may be used. For example, the internal electrode 121 and 122 may include nickel (Ni), copper (Cu), palladium (Pd), silver (Ag), gold (Au), platinum (Pt), tin (Sn), tungsten (W), titanium (Ti), and alloys thereof.

In addition, the internal electrode 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheets. As a printing method of the conductive paste for the internal electrodes, a screen-printing method, a gravure printing method, or the like may be used, but the present disclosure is not limited thereto.

A thickness te of the internal electrode 121 and 122 is not particularly limited.

To achieve high capacity of the multilayer electronic components, the thickness of the internal electrode 121 and 122 may be 1.0 μm or less, and to more easily achieve miniaturization and high capacitance of the multilayer electronic component, the thickness of the internal electrode 121 and 122 may be 0.6 μm or less, more preferably 0.4 μm or less.

In this case, the thickness te of the internal electrode 121 and 122 may mean a size of the internal electrode 121 and 122 in the first direction. In addition, the thickness te of the internal electrode 121 and 122 may mean an average thickness te of the internal electrode 121 and 122, and may mean an average size of the internal electrode 121 and 122 in the first direction.

The average size of the internal electrode 121 and 122 in the first direction may be measured by scanning images of cross-sections of the body 110 in the first and second directions with a scanning electron microscope (SEM) at a magnification of 10,000. More specifically, the average size of one internal electrode in the first direction may be an average value calculated by measuring a size of one internal electrode in the second direction at thirty (30) equally spaced points in the scanned image. The thirty (30) equally spaced points may be designated in the capacitance forming unit Ac. In addition, when such an average value is determined by extensively using measurements of average values to ten (10) internal electrodes, the average size of the internal electrode in the first direction may be further generalized.

In an embodiment of the present disclosure, an average thickness td of at least one of the plurality of dielectric layers 111 and an average thickness te of at least one of the plurality of internal electrodes 121 and 122 may satisfy $2 \times te < td$.

For example, the average thickness td of one dielectric layer 111 may be greater than twice the average thickness te of one internal electrode 121 and 122. Preferably, the average thickness td of the plurality of dielectric layers 111 may be greater than twice the average thickness te of the plurality of internal electrodes 121 and 122.

In general, for a high-voltage electronic component, a major issue may be reliability due to a decrease in breakdown voltage (BDV) under a high-voltage environment.

Therefore, to prevent a decrease in breakdown voltage under a high voltage environment, the average thickness td of the dielectric layer 111 may be made greater than twice the average thickness te of the internal electrodes 121 and 122, to increase a thickness of the dielectric layer, which may be a distance between internal electrodes, and improve breakdown voltage characteristics.

When the average thickness td of the dielectric layer 111 is less than twice the average thickness te of the internal electrodes 121 and 122, the average thickness of the dielectric layer, which may be the distance between the internal electrodes, may be thin, to decrease the breakdown voltage and to occur a short circuit between internal electrodes.

In high-voltage electronic components, the average thickness te of the internal electrodes may be 1 μm or less, and the average thickness td of the dielectric layer may be 3.0 μm or less, but are not necessarily limited thereto.

The body 110 may include a cover portion 112 and 113 disposed on both end-surfaces of the capacitance forming unit Ac in the first direction.

More specifically, the cover portion 112 and 113 may include an upper cover portion 112 disposed above the capacitance forming unit Ac in the first direction, and a lower cover disposed below the capacitance forming unit Ac in the first direction.

The upper cover portion 112 and the lower cover portion 113 may be formed by stacking a single dielectric layer or two or more dielectric layers on upper and lower surfaces of the capacitance forming portion Ac in the first direction, respectively, and may basically play a role in preventing damage to the internal electrode 121 and 122 due to physical or chemical stress.

The upper cover portion 112 and the lower cover portion 113 may not include the internal electrode 121 and 122, and may include the same material as the dielectric layer 111. For example, the upper cover portion 112 and the lower cover portion 113 may include a ceramic material, and may include, for example, a barium titanate (BaTiO₃)-based ceramic material.

In addition, various ceramic additives, organic solvents, binders, dispersants, or the like may be added to a powder of barium titanate (BaTiO₃) or the like, as a raw material forming the dielectric layer of the cover portion 112 and 113.

According to an embodiment of the present disclosure, the dielectric layer 111 included in the cover portion 112 and 113 may include the first acceptor element containing Al, the second acceptor element containing at least one of Mg, Mn, or V, and Ti, if a mole number of the first acceptor element relative to 100 moles of Ti contained in the dielectric layer 111 of the cover portion 112 and 113 is defined as A2, may satisfy A2≤0.50 mol, and, if a mole number of the second acceptor element is defined as T2, may satisfy A2/(A2+T2) <0.30.

In the present disclosure, the acceptor element included in the dielectric layer of the cover portion 112 and 113 may include a first acceptor element and a second acceptor element, which may be the same as the acceptor element included in the dielectric layer 111 of the capacitance forming portion Ac, and more specifically, the first acceptor element and the second acceptor element of the dielectric layer 111.

In addition, a description of the cover portion 112 and 113 may mean a description of each of the first cover portion 112 and the second cover portion 113, unless specifically stated otherwise, and also the first cover portion 112 and the second cover portion 113 may be included in the description.

When a mole number of A2 contained in the cover portion 112 and 113 is more than 0.50 mol or a ratio of A2/(A2+T2) is 0.30 or more, grain growth of the dielectric composition may be suppressed and porosity may increase, to deteriorate density and moisture resistance reliability, and when a sintering temperature is raised to overcome the above, there may be problems that mechanical properties deteriorate, and cracks or the like occur.

The cover portion 112 and 113 may include a plurality of dielectric grains, and the average size (G2) of the plurality of dielectric grains included in the cover portion 112 and 113 may be 150 nm or more and 250 nm or less, and preferably 180 nm or more and 220 nm or less.

A method of measuring sizes of the plurality of dielectric grains included in the cover portion 112 and 113 is not particularly limited, and may be identical to a method of measuring sizes of the plurality of dielectric grains included in the dielectric layer 111 of the capacitance forming portion Ac, as described above.

In an embodiment of the present disclosure, a ratio (stdev1/stdev2) of a size standard deviation (stdev1) of the plurality of dielectric grains included in the dielectric layer 111 of the capacitance forming portion Ac relative to a size standard deviation (stdev2) of the plurality of dielectric grains included in the cover portion 112 and 113 may satisfy 1.45≤stdev1/stdev2<2.10.

A ratio (stdev1/stdev2) of a size standard deviation (stdev1) of the plurality of dielectric grains included in the dielectric layer 111 of the capacitance forming portion Ac relative to a size standard deviation (stdev2) of the plurality of dielectric grains included in the cover portion 112 and 113 may satisfy 1.45≤stdev1/stdev2<2.10 to form dielectric grains of uniform size, thereby improving reliability of a multilayer electronic component.

In an embodiment of the present disclosure, if a ratio (stdev/G) of a size standard deviation (stdev) of the plurality of dielectric grains relative to an average size (G) of the plurality of dielectric grains is a coefficient of variation (CV1), a ratio (CV1/CV2) of a coefficient of variation (CV1) of the dielectric layer 111 relative to a coefficient of variation (CV2) of the cover portion 112 and 113 may satisfy 1.40≤CV1/CV2<1.51.

A ratio (CV1/CV2) of a coefficient of variation (CV1) of the dielectric layer 111 relative to a coefficient of variation (CV2) of the cover portion 112 and 113 may satisfy 1.40≤CV1/CV2<1.51 to form dielectric grains of uniform size, thereby improving reliability of a multilayer electronic component.

A thickness tc of the cover portion 112 and 113 is not particularly limited.

To more easily achieve miniaturization and high capacitance of the multilayer electronic component, the thickness tc of the cover portion 112 and 113 may be 100 μm or less, preferably 30 μm or less, and, in case of ultra-small products, more preferably 20 μm or less.

In this case, the thickness tc of the cover portion 112 and 113 may mean a size of the cover portion 112 and 113 in the first direction. In addition, the thickness tc of the cover portion 112 and 113 may mean an average thickness tc of the cover portion 112 and 113, and may mean an average size of the cover portion 112 and 113 in the first direction.

The average size of the cover portion 112 and 113 in the first direction may be measured by scanning images of cross-sections of the body 110 in the first and second directions with a scanning electron microscope (SEM) at a magnification of 10,000. More specifically, the average size may be an average value calculated by measuring the size in the first direction at 30 equally spaced points in the second direction in the scanned image of one cover portion.

In addition, the average size of the cover portion in the first direction measured by the above-described method may be substantially the same as the average size of the cover portion in the first direction, in cross-sections of the body 110 in the first and third directions.

Side margin portions 114 and 115 may be disposed on both end-surfaces of the body 110 in the third direction.

More specifically, the side margin portions 114 and 115 may include a first side margin portion 114 disposed on the fifth surface 5 of the body 110, and a second side margin portion 115 disposed on the sixth surface 6 of the body 110. For example, the side margin portions 114 and 115 may be disposed on both end-surfaces of the body 110 in the third direction.

As illustrated, the side margin portions 114 and 115 may refer to regions between both end-surfaces of the body 110 in the third direction and a boundary surface of the body 110, in a cross-section of the body 110 cut in the first and third directions.

The side margin portions 114 and 115 may be prepared by applying a conductive paste on a ceramic green sheet to form the internal electrode 121 and 122, except for a portion in which the side margin portions 114 and 115 are formed, and, to suppress a step difference due to the internal electrode 121 and 122, cutting the internal electrode 121 and 122 to expose the fifth and sixth surfaces 5 and 6 of the body 110, and then stacking a single dielectric layer 111 or two or more dielectric layers 111 in the third direction on both end-surfaces of the capacitance forming portion Ac in the third direction.

The side margin portions 114 and 115 may basically play a role in preventing damage to the internal electrode 121 and 122 due to physical or chemical stress.

The first side margin portion 114 and the second side margin portion 115 may not include the internal electrode 121 and 122, and may include the same material as the dielectric layer 111. For example, the first side margin portion 114 and the second side margin portion 115 may include a ceramic material, and may include, for example, a barium titanate ($BaTiO_3$)-based ceramic material.

In addition, various ceramic additives, organic solvents, binders, dispersants, or the like may be added to a powder of barium titanate ($BaTiO_3$) or the like, as a raw material for forming the dielectric layer of the side margin portions 114 and 115.

A width in the third direction (or a thickness) wm of each of the first and second side margin portions 114 and 115 is not particularly limited.

To more easily achieve miniaturization and high capacitance of the multilayer electronic component 100, the width wm of each of the first and second side margin portions 114 and 115 may be 100 μm or less, and preferably 30 μm or less, and, in case of ultra-small products, more preferably 20 μm or less.

In this case, the width wm of each of the side margin portions 114 and 115 may mean a size of each of the side margin portions 114 and 115 in the third direction. Also, the width wm of each of the side margin portions 114 and 115 may mean an average width wm of each of the side margin portions 114 and 115, and may mean an average size of each of the side margin portions 114 and 115 in the third direction.

The average size of each of the side margins 114 and 115 in the third direction may be measured by scanning images of cross-sections of the body 110 in the first and third directions with a scanning electron microscope (SEM) at a magnification of 10,000. More specifically, the average size may refer to an average value calculated by measuring sizes in the third direction at ten (10) equally spaced points in the first direction in a scanned image of one side margin.

In an embodiment of the present disclosure, a structure in which the multilayer electronic component 100 has two external electrode 131 and 132 is illustrated, but the number, shapes, or the like of the external electrode 131 and 132 may be changed, depending on a shape of the internal electrode 121 and 122, or other purposes.

The external electrode 131 and 132 may be disposed on the body 110 and connected to the internal electrode 121 and 122.

More specifically, the external electrode 131 and 132 may include first and second external electrodes 131 and 132 disposed on the third and fourth surfaces 3 and 4 of the body 110, respectively, and may be connected to the first and second internal electrodes 121 and 122, respectively. For example, the first external electrode 131 may be disposed on the third surface 3 of the body, and may be connected to the first internal electrode 121, and the second external electrode 132 may be disposed on the fourth surface 4 of the body, and may be connected to the second internal electrode 122.

The external electrode 131 and 132 may be formed of any material as long as they have electrical conductivity, such as metal or the like, and a specific material may be determined in consideration of electrical characteristics, structural stability, or the like, and may further have a multilayer structure.

For example, the external electrode 131 and 132 may include electrode layers 131a, 132a, 131b, and 132b disposed on the body 110, and plating layers 131c and 132c disposed on the electrode layers 131a, 132a, 131b, and 132b.

As a more specific example of the electrode layers 131a, 132a, 131b, and 132b, the electrode layers 131a, 132a, 131b, and 132b may be sintered electrodes including a first conductive metal and glass or resin-based electrodes including a second conductive metal and a resin.

In this case, the first conductive metal may refer to a conductive metal included in the first electrode layers 131a and 132a, and the second conductive metal may refer to a conductive metal included in the second electrode layers 131b and 132b. In this case, the first conductive metal and the second conductive metal may be the same or different, and may include the same metal material, but are not limited thereto.

In addition, the electrode layers 131a, 132a, 131b, and 132b may have a form in which a sintered electrode and a resin-based electrode are sequentially formed on the body.

In addition, the electrode layers 131a, 132a, 131b, and 132b may be formed by transferring a sheet containing the conductive metal onto the body, or may be formed by transferring a sheet containing the conductive metal onto a sintered electrode.

A material with excellent electrical conductivity may be used as the conductive metal included in the electrode layers 131a, 132a, 131b, and 132b. For example, the conductive metal may include one or more of nickel (Ni), copper (Cu), palladium (Pd), silver (Ag), gold (Au), platinum (Pt), tin (Sn), tungsten (W), titanium (Ti), and alloys thereof, but is not limited thereto.

In an embodiment of the present disclosure, the electrode layers 131a, 132a, 131b, and 132b may have a two-layer structure including first electrode layers 131a and 132a and second electrode layers 131b and 132b, and the external electrode 131 and 132 may include the first electrode layers 131a and 132a containing a conductive metal and glass, and the second electrode layers 131b and 132b disposed on the first electrode layers 131a and 132a and containing a conductive metal and a resin.

The first electrode layers 131a and 132a may include glass to improve adhesion to the body 110, and the second electrode layers 131b and 132b may include a resin to improve bending strength.

The conductive metal used in the first electrode layers 131a and 132a is not particularly limited as long as it is a material that may be electrically connected to the internal electrodes 121 and 122 to form capacitance, and may include, for example, one or more selected from the group consisting of nickel (Ni), copper (Cu), palladium (Pd), silver (Ag), gold (Au), platinum (Pt), tin (Sn), tungsten (W), titanium (Ti), and alloys thereof. The first electrode layers 131a and 132a may be formed by applying a conductive paste prepared by adding a glass frit to the conductive metal powder and then sintering the same.

The conductive metal included in the second electrode layers 131b and 132b may serve to be electrically connected to the first electrode layers 131a and 132a.

The conductive metal included in the second electrode layers 131b and 132b is not particularly limited as long as it is a material that may be electrically connected to the first electrode layers 131a and 132a, and may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the second electrode layers 131b and 132b may include at least one of a spherical particle or a flake-shaped particle. For example, the conductive metal may consist only of flake-shaped particles, may consist only of only spherical particles, or may be a mixture of the flake-shaped particles and the spherical particles. In this case, the spherical particle may include a shape that may not be completely spherical, for example, a shape in which a length ratio of a major axis and a minor axis (major axis/minor axis) is 1.45 or less. The flake-type particle refers to a particle having a flat and elongated shape, and is not particularly limited, but for example, a length ratio of a major axis and a minor axis (major axis/minor axis) may be 1.95 or more. Lengths of the major axis and the minor axis in the spherical particle and the flake-shaped particle may be measured from images obtained by scanning cross-sections in the first and second directions cut from a central portion of the multilayer electronic component in the third direction with a scanning electron microscope (SEM).

The resin included in the second electrode layers 131b and 132b may ensure bonding properties and serve as a shock absorber. The resin included in the second electrode layers 131b and 132b is not particularly limited as long as it has bonding properties and shock absorption properties, may be mixed with a conductive metal powder to make a paste, and may include, for example, an epoxy resin.

Additionally, the second electrode layers 131b and 132b may include a plurality of metal particles, an intermetallic compound, and a resin. The intermetallic compound may be included to further improve electrical connectivity with the first electrode layers 131a and 132a. The intermetallic compound may serve to improve electrical connectivity by connecting a plurality of metal particles, and may serve to surround and connect the plurality of metal particles to each other.

In this case, the intermetallic compound may include a metal having a melting point, lower than a curing temperature of a resin. For example, since the intermetallic compound may include a metal having a melting point, lower than a curing temperature of a resin, the metal having a melting point, lower than a curing temperature of the resin may melt during drying and curing processes, may form the intermetallic compound, with metal particles, and may surround the metal particles. In this case, the intermetallic compound may preferably include a low melting point metal of 300° C. or lower.

For example, the intermetallic compound may include Sn, which has a melting point of 213 to 220° C. During the drying and curing processes, Sn may be melted, and the melted Sn may wet a high melting point metal particle such as Ag, Ni or Cu by a capillary phenomenon, and may react with a portion of Ag, Ni or Cu metal particles to form the intermetallic compound such as $Ag_3Sn$, $Ni_3Sn_4$, $Cu_6Sn_5$, $Cu_3Sn$, or the like. Ag, Ni or Cu that did not participate in the reaction may remain as a metal particle.

Therefore, the plurality of metal particles may include at least one of Ag, Ni, or Cu, and the intermetallic compound may include at least one of $Ag_3Sn$, $Ni_3Sn_4$, $Cu_6Sn_5$, or $Cu_3Sn$.

The plating layers 131c and 132c may play a role in improving mounting characteristics.

A type of the plating layer (131c and 132c) is not particularly limited, may be a single layer plating layer (131c or 132c) containing at least one of nickel (Ni), tin (Sn), palladium (Pd), or an alloy thereof, and may be formed as a plurality of layers.

For a more specific example of the plating layer (131c and 132c), the plating layer (131c and 132c) may be an Ni plating layer or an Sn plating layer, the Ni plating layer and the Sn plating layer may be sequentially formed on the electrode layers 131a, 132a, 131b, and 132b, and the Sn plating layer, the Ni plating layer, and the Sn plating layer may be sequentially formed. In addition, the plating layer (131c and 132c) may include a plurality of Ni plating layers and/or a plurality of Sn plating layers.

Although embodiments of the present disclosure have been described in detail above, the present disclosure is not limited by the above-described embodiments and the accompanying drawings, and is intended to be limited by the appended claims. Therefore, various forms of substitution, modification, and change will be possible by those skilled in the art within the scope of the technical spirit of the present disclosure described in the claims, which also falls within the scope of the present disclosure.

Hereinafter, the present disclosure will be described in more detail through examples, but this may be to facilitate a detailed understanding of the present disclosure, and the scope of the present disclosure is not limited by the examples.

EXAMPLE

Table 1 below illustrates average size ratios of dielectric grains of a capacitance forming portion to a size standard deviation ratios of the cover portion, grains, and coefficient of variation ratios, dielectric when adding different molar numbers of first and second acceptor elements included in a dielectric layer of the capacitance forming portion.

A1 corresponds to a mole number of the first acceptor element relative to 100 moles of Ti contained in the dielectric layer of the capacitance forming portion, and the first acceptor element corresponds to the Al element.

T1 corresponds to a mole number of the second acceptor element relative to 100 moles of Ti contained in the dielectric layer of the capacitance forming portion, and the second acceptor element corresponds to at least one element among Mg, Mn, or V.

G1 is a measured value of an average size of dielectric grains included in the dielectric layer of the capacitance forming portion, and G2 is a measured value of an average size of dielectric grains included in the cover portion.

A mole number (A2) of the first acceptor element relative to 100 moles of Ti contained in the cover portion is 0.50 mol or less, and a relationship with a mole number (T2) of the second acceptor element relative to 100 moles of Ti contained in the cover portion satisfied $A2/(A2+T2)<0.30$.

TABLE 1

| Sample No. | Capacitance Forming Portion (mol) | | G1 (nm) | G2 (nm) | G1/G2 |
| | A1 (mol) | A1/(A1 + T1) | | | |
|---|---|---|---|---|---|
| Test Example 1 | 0.6 | 0.55 | 290 | 197 | 1.47 |
| Test Example 2 | 0.5 | 0.5 | 242 | 201 | 1.20 |

15

TABLE 1-continued

| Sample No. | Capacitance Forming Portion (mol) | | G1 | G2 | |
| | A1 (mol) | A1/(A1 + T1) | (nm) | (nm) | G1/G2 |
| --- | --- | --- | --- | --- | --- |
| Test Example 3 | 0.4 | 0.44 | 203 | 196 | 1.04 |
| Test Example 4 | 0.3 | 0.38 | 167 | 204 | 0.82 |

FIGS. 5A to 7C are graphs illustrating dielectric layers, cover portions, and severe reliability evaluation of capacitance forming portions of test examples.

More specifically, FIGS. 5A to 5D are images of capacitance forming portions of Test Examples 1 to 4, respectively, captured using an SEM, and dielectric grains are extracted and displayed for easy confirmation through a program.

FIGS. 6A to 6D are images of cover portions of Test Examples 1 to 4, respectively, captured using an SEM, and dielectric grains are extracted and displayed for easy confirmation through a program.

FIGS. 7A to 7C are graphs illustrating severe reliability evaluation (a highly accelerated life test (HALT)) of Test Examples 1 to 3, respectively.

40 sample chips were manufactured for each test example, the 40 sample chips for each test example were applied under a temperature condition of 105° C. and a voltage condition of 15V for 60 hours, and, based on an initial insulation resistance (IR0) value of $10^9 \Omega$, sample chips of which insulation resistance (IR) value fell $10^4 \Omega$ or lower were evaluated as defective and counted, and sample chips of which insulation resistance (IR) value did not fall $10^4 \Omega$ or lower were evaluated as normal.

In Test Example 1, 30 sample chips out of 40 sample chips were evaluated as defective, in Test Example 2, 11 sample chips out of 40 sample chips were evaluated as defective, and in Test Example 3, 7 sample chips out of 40 sample chips were evaluated as defective.

It can be seen that, from Test Example 1 to Test Example 4, an amount of the first acceptor element included in the dielectric layer of the capacitance forming portion decreases, an average size of the dielectric grains also decreases, even with a small amount of the first acceptor element, a change to an n-type composition progresses, insulation resistance is improved, and as a result, frequency of sample chip failures decreases during severe reliability evaluation.

In addition, the expression 'an embodiment' used in this specification does not mean the same embodiment, and may be provided to emphasize and describe different unique characteristics. However, an embodiment presented above may not be excluded from being implemented in combination with features of another embodiment. For example, although the description in a specific embodiment is not described in another example, it can be understood as an explanation related to another example, unless otherwise described or contradicted by the other embodiment.

The terms used in this disclosure are used only to illustrate various examples and are not intended to limit the present inventive concept. Singular expressions include plural expressions unless the context clearly dictates otherwise.

One of many effects of the present disclosure is to have excellent high-temperature reliability of a multilayer electronic component.

Various advantages and effects of the present disclosure are not limited to the above description, and will be more easily understood in the process of describing specific embodiments of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and a plurality of internal electrodes; and
an external electrode disposed on the body,
wherein the body includes a capacitance forming portion including the plurality of dielectric layers and the plurality of internal electrodes alternately disposed with the plurality of dielectric layers in a first direction, and a cover portion disposed on both end-surfaces of the capacitance forming portion in the first direction,
wherein one of the plurality of dielectric layers includes a first acceptor element containing Al, a second acceptor element containing at least one of Mg, Mn, or V, and Ti,
wherein 0.4 mol≤A1<0.6 mol and 0.44≤A1/(A1+T1) <0.55, in which A1 is a mole number of the first acceptor element, relative to 100 moles of Ti contained in the one of the plurality of dielectric layers, and T1 is a mole number of the second acceptor element, relative to 100 moles of Ti contained in the one of the plurality of dielectric layers,
wherein the one of the plurality of dielectric layers and the cover portion include a plurality of dielectric grains, and a ratio (G1/G2) of an average size (G1) of the plurality of dielectric grains included in the one of the plurality of dielectric layers relative to an average size (G2) of the plurality of dielectric grains included in the cover portion satisfies 1.00≤G1/G2<1.50,
wherein the cover portion comprises the first acceptor element, the second acceptor element, and Ti,
wherein A2≤0.50 mol, in which A2 is a mole number of the first acceptor element relative to 100 moles of Ti contained in the cover portion, and
wherein A2/(A2+T2)<0.30, in which T2 is a mole number of the second acceptor element relative to 100 moles of Ti contained in the cover portion.

2. The multilayer electronic component of claim 1, wherein A2 is a mole number of Al relative to 100 miles of Ti contained in the cover portion.

3. The multilayer electronic component of claim 1, wherein A2 is a mole number of Al relative to 100 moles of Ti contained in the cover portion, and T2 is a mole number of Mg, Mn, and V relative to 100 moles of Ti contained in the cover portion.

4. The multilayer electronic component of claim 1, wherein the average size (G1) of the plurality of dielectric grains included in the one of the plurality of dielectric layers is 100 nm or more and 400 nm or less.

5. The multilayer electronic component of claim 1, wherein the average size (G2) of the plurality of dielectric grains included in the cover portion is 150 nm or more and 300 nm or less.

6. The multilayer electronic component of claim 1, wherein a ratio (stdev1/stdev2) of a size standard deviation (stdev1) of the plurality of dielectric grains included in the one of the plurality of dielectric layers relative to a size standard deviation (stdev2) of the plurality of dielectric grains included in the cover portion satisfies 1.45≤stdev1/stdev2<2.10.

7. The multilayer electronic component of claim 1, wherein, a ratio (stdev1/G1) of a size standard deviation (stdev1) of the plurality of dielectric grains included in the one of the plurality of dielectric layers relative to an average size (G1) of the plurality of dielectric grains is a coefficient of variation (CV1), and a ratio (stdev2/G2) of a size standard deviation (stdev2) of the plurality of dielectric grains included in the cover portion relative to an average size (G2) of the plurality of dielectric grains is a coefficient of variation (CV2), a ratio (CV1/CV2) of the coefficient of variation (CV1) of the one of the plurality of dielectric layers relative to the coefficient of variation (CV2) of the cover portion satisfies 1.40≤CV1/CV2<1.51.

8. The multilayer electronic component of claim 1, wherein an average thickness of the one of the plurality of dielectric layers is 3.0 μm or less.

9. The multilayer electronic component of claim 1, wherein an average thickness of at least one of the plurality of internal electrodes is 1.0 μm or less.

10. The multilayer electronic component of claim 1, wherein 2×te<td is satisfied, in which td is an average thickness of the one of the plurality of dielectric layers, and te is an average thickness of at least one of the plurality of internal electrodes.

11. The multilayer electronic component of claim 1, wherein an average thickness of the cover portion in the first direction is 20 μm or less.

12. The multilayer electronic component of claim 1, wherein the external electrode is disposed on the body in a second direction, perpendicular to the first direction, wherein the multilayer electronic component further comprises a side margin portion disposed on both end-surfaces of the capacitance forming portion in a third direction, perpendicular to the first and second directions.

13. The multilayer electronic component of claim 12, wherein an average size of the side margin portion in the third direction is 20 μm or less.

14. The multilayer electronic component of claim 1, wherein A1 is a mole number of Al relative to 100 moles of Ti contained in the one of the plurality of dielectric layers, and T1 is a mole number of Mg, Mn, and V, relative to 100 moles of Ti contained in the one of the plurality of dielectric layers.

* * * * *